(12) United States Patent
Hershberger

(10) Patent No.: US 7,931,432 B2
(45) Date of Patent: Apr. 26, 2011

(54) GRAIN SPREADER

(76) Inventor: Nelson Hershberger, Calhoun, IL (US)

( * ) Notice: Subject to any disclaimer, the term of this patent is extended or adjusted under 35 U.S.C. 154(b) by 388 days.

(21) Appl. No.: 12/213,864

(22) Filed: Jun. 25, 2008

(65) Prior Publication Data

US 2009/0324372 A1 Dec. 31, 2009

(51) Int. Cl.
*B65G 65/32* (2006.01)
(52) U.S. Cl. ......................................... 414/301; 239/687
(58) Field of Classification Search .................. 414/195, 414/206, 301; 239/687
See application file for complete search history.

(56) References Cited

U.S. PATENT DOCUMENTS

| 1,066,281 | A | * | 7/1913 | Keith ............................ 414/195 |
| 3,001,465 | A | * | 9/1961 | Donelson, Jr. ................. 454/182 |
| 3,038,643 | A | * | 6/1962 | Van Der Lely et al. ....... 239/683 |
| 3,111,399 | A | * | 11/1963 | Trom ................................. 34/59 |
| 3,248,117 | A | * | 4/1966 | Donelson, Jr. ................. 239/684 |
| 3,298,748 | A | * | 1/1967 | Hultgren ......................... 406/162 |
| 4,040,529 | A | * | 8/1977 | Wurdeman et al. ............ 414/301 |
| 4,216,914 | A | * | 8/1980 | O'Hanlon ...................... 239/666 |
| 4,272,028 | A | * | 6/1981 | Cobb ............................. 239/687 |
| 4,397,423 | A | | 8/1983 | Beaver et al. |
| 4,725,005 | A | * | 2/1988 | Wiegelmann ................. 239/682 |
| 5,020,701 | A | * | 6/1991 | Donelson ....................... 222/494 |
| 5,372,467 | A | | 12/1994 | Harris |
| 5,393,189 | A | | 2/1995 | Berquist |
| 5,755,837 | A | * | 5/1998 | Beierle et al. ....................... 48/76 |
| 6,923,389 | B2 | | 8/2005 | Shivvers |
| 7,717,063 | B2 | * | 5/2010 | Chang et al. ................ 119/57.91 |

* cited by examiner

*Primary Examiner* — James Keenan
(74) *Attorney, Agent, or Firm* — Richard C. Litman

(57) ABSTRACT

The grain spreader is a device for evenly spreading particulate material in a storage facility, particularly for spreading grain in a silo or storage bin. The grain spreader includes an array of grain receiving chutes suspended for rotation on a shaft and positioned below a hopper outlet. The shaft is mounted to rotate around its longitudinal axis and thereby enable the chutes to rotate when impelled by the force of grain exiting the hopper outlet. The grain receiving chutes are uniquely designed in a manner to cause the grain to be evenly spread in the silo or storage bin.

6 Claims, 2 Drawing Sheets

GRAIN SPREADER

BACKGROUND OF THE INVENTION

1. Field of the Invention

The present invention generally relates to agricultural equipment and machinery, and particularly to a grain spreader for evenly distributing grain in a silo or storage bin.

2. Description of the Related Art

During the filling process, grains (corn, soybeans, wheat, rice, etc.) are conventionally conveyed to the top of a silo or storage bin and fed through a central inlet for storage therein. Grain is stored with fines in one location. Since most grains tend to deteriorate rapidly if the seed coat is cracked or fractured, it is economically prudent to minimize fracturing or cracking when distributing the grain in the silo or bin. It is also economically prudent to evenly spread the fines and distribute the grain in a manner that will minimize fine build-up, which inhibits ventilation and results in the build-up of heat and moisture. These conditions lead to further grain deterioration. Structure that can be employed to evenly spread grain in a storage facility in an efficient and effective manner and to evenly distribute air through the grain would certainly be a welcome addition to the art. Thus, a grain spreader solving the aforementioned problems is desired.

SUMMARY OF THE INVENTION

The present invention relates to a grain spreader for evenly spreading particulate material in a storage facility, particularly for spreading grain in a silo or storage bin. The spreader has a hopper and an array of grain receiving chutes suspended for rotation on a shaft and positioned below the hopper outlet. The shaft is mounted to rotate around its longitudinal axis and thereby enable the chutes to rotate when impelled by the force of grain exiting the hopper outlet. The grain-receiving chutes are uniquely designed in a manner to cause the grain to be evenly spread in the silo or storage bin.

Accordingly, the invention presents a grain spreader that is provided with an array of grain-receiving chutes, the chutes being adapted to spread incoming grain in a silo or storage bin and the like. The chutes are configured to spread the grain in an efficient and effective manner so that the grain is evenly spread and the incidence of caking and uneven drying is greatly reduced. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
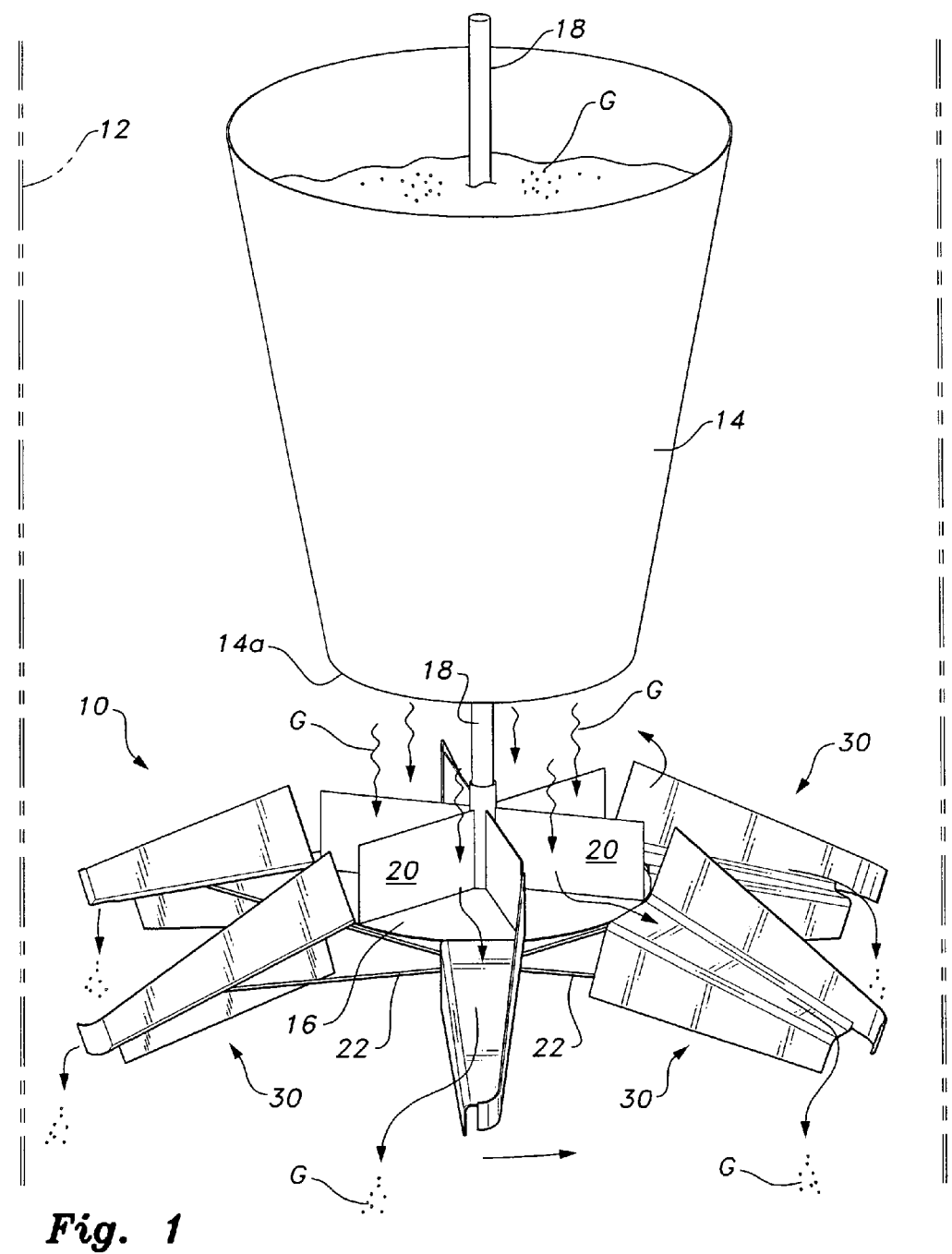
FIG. 1 is an environmental, perspective view of a grain spreader according to the present invention.

Attention is first directed to FIG. 1, wherein an exemplary grain spreader device of the present invention is generally indicated at 10. The device is positioned in the upper regions of a silo or storage bin 12 (shown in phantom lines). Grain G, to be spread in the silo, is fed into a hopper 14 via an inlet (not shown) in the top of the silo 12. The arrangement and construction of the silo 12 and hopper 14 is conventional and is not part of the inventive concept, per se.

Device 10 comprises a disk 16 positioned below the outlet 14*a* of hopper 14. Disk 16 is mounted on shaft 18 for rotation therewith. The bearings and spring mechanisms for the shaft 18 are conventional. A plurality of radial guide vanes 20 are mounted on the upper surface of disk 16. A plurality of grain spreading chutes 30 are attached to and mounted around the periphery of disk 16 in any suitable and convenient manner. The chutes 30 are positioned to slope downwardly from their attachment to disk 16. The number of vanes 20 is equal to the number of chutes 30. Bracing rods 22 provide additional support for chutes 30.

Figure 2:
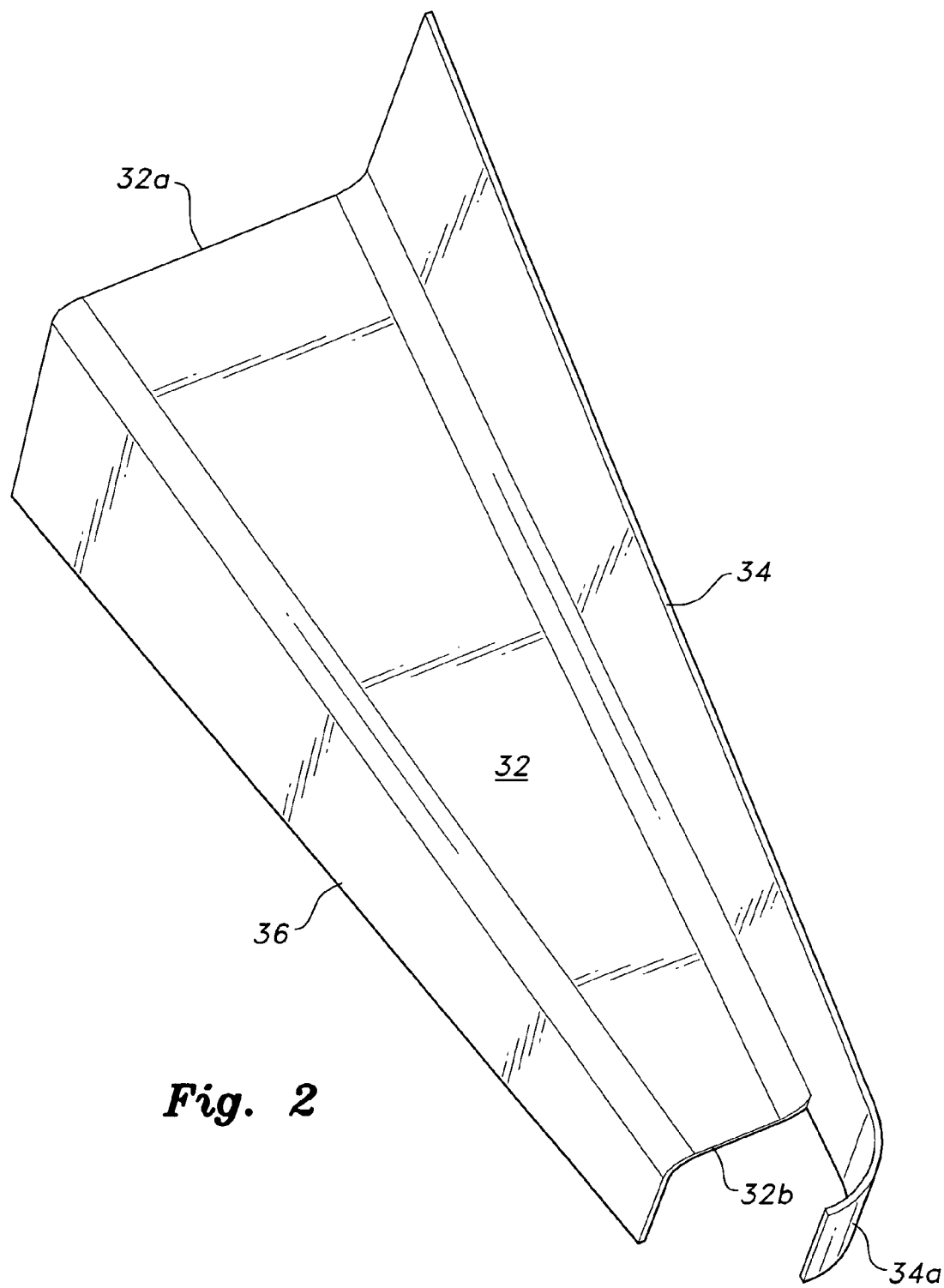
FIG. 2 is a perspective view of a chute of a grain spreader according to the present invention.

As best seen in FIG. 2, each chute 30 comprises a tapered planar surface 32 having a wide proximate end 32*a* arranged for attachment to disk 16. The narrow distal end 32*b* is a free end. The leading edge (relative to rotation direction) of chute 30 is coextensive with planar surface 32 and is formed as an upwardly directed wall 34. Wall 34 extends in an approximate upward perpendicular direction from surface 32. Wall 34 extends beyond free end 32*b* and terminates in a curved surface 34*a*, the surface 34*a* being curved in the direction of the trailing edge of chute 30 so that a concave face of curved surface 34 faces free end 32*b*. The trailing edge of chute 30 is also coextensive with surface 32 and is formed as a downwardly directed wall 36. Wall 36 extends in an approximately downward perpendicular direction from surface 32. Wall 36 is coextensive with the length of surface 32.

In use, grain fed from hopper 14 is directed by respective vanes 20 onto respective chutes 30. The force of the falling grain G causes the disk 16 and chute 30 to rotate. The design of the chute 30 allows the grain G to drop off the chute 30 along the entire length of the trailing edge 36, thereby alleviating the possibility of build-up or caking and permitting the grain G to be evenly spread across the entire silo or bin. The curved end 34*a* of the chute 30 functions to dampen chute speed and vibration, further aiding the grain distribution.

It is to be understood that the present invention is not limited to the embodiment described above, but encompasses any and all embodiments within the scope of the following claims.

I claim:

1. A grain spreader, comprising:
    a disk having an upper surface and a periphery;
    an array of radial vanes disposed on the upper surface of the disk;
    an array of grain spreading chutes mounted to the periphery of the disk and sloping downwardly from the upper surface, each of the chutes of the array having an upper surface defining a tapered, planar, continuous, imperforate surface defining a leading edge, a trailing edge, a wide proximate end and a narrow distal end, wherein the wide proximate end of said planar surface of each said chute is mounted to the periphery of said disk;
    a first wall extending along the leading edge upwardly from the planar surface and being substantially aligned with a respective radial vane; and
    a second wall extending along the trailing edge downwardly from the planar surface so as to negate the formation of an upstanding wall, the first wall having a greater length than the second wall.

2. The grain spreader according to claim 1, wherein the wide proximate end of said planar surface of each said chute is mounted to the periphery of said disk and being substantially aligned with a respective radial vane.

3. The grain spreader according to claim 2, wherein said first wall has an end formed as a curved surface spaced from the narrow distal end of said disk, presenting a concave face to the distal end of said chute.

4. A grain spreader, comprising:
a hopper having an outlet for dispersing particulate matter;
a rotatable shaft extending into the hopper;
a disk connected to the rotatable shaft and disposed below the outlet, the disk having an upper surface and a periphery;
an array of radial vanes disposed on the upper surface of the disk;
an array of grain spreading chutes mounted to the periphery of the disk and sloping downwardly from the upper surface, each of the chutes of the array having an upper surface defining a tapered, planar, continuous, imperforate surface defining a leading edge, a trailing edge, a wide proximate end and a narrow distal end, wherein the wide proximate end of said planar surface of each said chute is mounted to the periphery of said disk;
a first wall extending upwardly from the leading edge of the chute and being substantially aligned with a respective radial vane; and
a second wall extending downwardly from the trailing edge so as to negate the formation of an upstanding wall, the first wall having a greater length than the second wall.

5. The grain spreader according to claim 4, wherein the wide proximate end of said planar surface of each of the chutes is mounted to the periphery of said disk.

6. The grain spreader according to claim 4, wherein said first wall has an end formed as a curved surface spaced from said narrow distal end, presenting a concave face thereto.

* * * * *